(12) United States Patent
Chakraborty

(10) Patent No.: US 7,305,612 B2
(45) Date of Patent: Dec. 4, 2007

(54) SYSTEMS AND METHODS FOR AUTOMATIC FORM SEGMENTATION FOR RASTER-BASED PASSIVE ELECTRONIC DOCUMENTS

(75) Inventor: Amit Chakraborty, Cranbury, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 343 days.

(21) Appl. No.: 10/403,106

(22) Filed: Mar. 31, 2003

(65) Prior Publication Data

US 2004/0194035 A1    Sep. 30, 2004

(51) Int. Cl.
G06F 17/00 (2006.01)
(52) U.S. Cl. .............. 715/505; 715/513; 715/780; 382/202; 382/282; 382/289
(58) Field of Classification Search ........... 715/530, 715/513, 863, 780, 507, 506, 505; 382/289, 382/202, 317, 311, 296, 293, 290, 28, 20, 382/282
See application file for complete search history.

(56) References Cited

U.S. PATENT DOCUMENTS

| | | | |
|---|---|---|---|
| 4,503,556 A * | 3/1985 | Scherl et al. | 382/176 |
| 4,558,461 A * | 12/1985 | Schlang | 382/290 |
| 4,933,979 A * | 6/1990 | Suzuki et al. | 382/173 |
| 5,001,766 A * | 3/1991 | Baird | 382/290 |
| 5,054,098 A * | 10/1991 | Lee | 382/289 |
| 5,091,868 A * | 2/1992 | Pickens et al. | 715/506 |
| 5,140,650 A * | 8/1992 | Casey et al. | 382/283 |
| 5,182,656 A * | 1/1993 | Chevion et al. | 358/452 |
| 5,191,525 A * | 3/1993 | LeBrun et al. | 715/500 |
| 5,231,510 A * | 7/1993 | Worthington | 358/400 |
| 5,235,654 A * | 8/1993 | Anderson et al. | 382/180 |
| 5,245,676 A * | 9/1993 | Spitz | 382/235 |
| 5,251,273 A * | 10/1993 | Betts et al. | 382/311 |
| 5,293,429 A * | 3/1994 | Pizano et al. | 382/202 |
| 5,394,487 A * | 2/1995 | Burger et al. | 382/209 |
| 5,420,974 A * | 5/1995 | Morris et al. | 715/515 |
| 5,452,374 A * | 9/1995 | Cullen et al. | 382/293 |
| 5,455,872 A * | 10/1995 | Bradley | 382/228 |
| 5,517,587 A * | 5/1996 | Baker et al. | 382/296 |
| 5,588,072 A * | 12/1996 | Wang | 382/176 |
| 5,631,984 A * | 5/1997 | Graf et al. | 382/317 |
| 5,642,288 A * | 6/1997 | Leung et al. | 700/223 |
| 5,721,940 A * | 2/1998 | Luther et al. | 715/506 |
| 5,748,809 A * | 5/1998 | Hirsch | 382/317 |
| 5,793,887 A * | 8/1998 | Zlotnick | 382/209 |
| 5,809,167 A * | 9/1998 | Al-Hussein | 382/190 |
| 5,819,265 A * | 10/1998 | Ravin et al. | 707/5 |
| 5,893,127 A * | 4/1999 | Tyan et al. | 715/513 |

(Continued)

OTHER PUBLICATIONS

Author unknown, "Hough Transform", from Wikipedia, downloaded Jul. 7, 2005.*

(Continued)

Primary Examiner—Doug Hutton
Assistant Examiner—James H. Blackwell
(74) Attorney, Agent, or Firm—Donald B. Paschburg; F. Chau & Associated, LLC (57) ABSTRACT

Systems and methods for automatically extracting form information (document structure, elements, format, etc.) from electronic documents such as raster-based passive documents, and storing such form information in a file in accordance with a predetermined DTD (document type definition).

14 Claims, 5 Drawing Sheets

U.S. PATENT DOCUMENTS

| | | | | |
|---|---|---|---|---|
| 5,907,633 | A * | 5/1999 | Fromenteau et al. | 382/209 |
| 5,950,213 | A * | 9/1999 | Iida et al. | 715/505 |
| 5,963,966 | A * | 10/1999 | Mitchell et al. | 715/513 |
| 6,038,351 | A * | 3/2000 | Rigakos | 382/209 |
| 6,336,124 | B1 * | 1/2002 | Alam et al. | 715/523 |
| 6,400,845 | B1 * | 6/2002 | Volino | 382/176 |
| 6,535,619 | B1 * | 3/2003 | Suwa et al. | 382/101 |
| 6,651,217 | B1 * | 11/2003 | Kennedy et al. | 715/507 |
| 6,662,340 | B2 * | 12/2003 | Rawat et al. | 715/507 |
| 6,674,919 | B1 * | 1/2004 | Ma et al. | 382/289 |
| 6,714,939 | B2 * | 3/2004 | Saldanha et al. | 707/102 |
| 6,720,985 | B1 * | 4/2004 | Silverbrook et al. | 715/863 |
| 6,757,870 | B1 * | 6/2004 | Stinger | 715/513 |
| 6,886,136 | B1 * | 4/2005 | Zlotnick et al. | 715/780 |
| 6,978,046 | B2 * | 12/2005 | Robinson et al. | 382/209 |
| 2002/0065847 | A1 * | 5/2002 | Furukawa et al. | 707/505 |
| 2002/0091688 | A1 * | 7/2002 | Decary et al. | 707/6 |
| 2002/0107885 | A1 * | 8/2002 | Brooks et al. | 707/505 |
| 2002/0111963 | A1 * | 8/2002 | Gebert et al. | 707/513 |
| 2002/0156817 | A1 * | 10/2002 | Lemus | 707/531 |
| 2003/0188260 | A1 * | 10/2003 | Jensen et al. | 715/505 |
| 2004/0205533 | A1 * | 10/2004 | Lopata et al. | 715/507 |
| 2005/0268217 | A1 * | 12/2005 | Garrison | 715/505 |

OTHER PUBLICATIONS

K. Taghva, A. Condit, and Borsack. Autotag: A Tool for Creating Structured Document Collections from Printed Material. Technical Report TR 94-11, Information Science Research Institute, University of Nevada, 1994.*

Watanabe et al., "Layout Recognition Multi-Kinds of Table-Form Documents", 1995, IEEE, pp. 432-445.*

Lam et al., "Anatomy og a Form Reader", 1993, IEEE, pp. 506-509.*

Cesarini et al., "INFORMys: A Flexible Invoice-Like Form-Reader System", 1998, IEEE, pp. 730-745.*

Chen et al., "A Novel Form Structure Extraction Method Using Strip Projection", 1996, IEEE, pp. 823-827.*

Wong et al., "Use of Colour in Form Layout Analysis", 2001, IEEE, pp. 942-946.*

Fujisawa et al., "Segmentation Methods for Character Recognition: From Segmentation to Document Structure Analysis", 1992, IEEE, pp. 1079-1092.*

Cesarini et al., "A System for Data Extraction From Forms of Known Class", 1995, IEEE, pp. 1136-1140.*

Adobe White Paper,"The Four Flavors of Adobe PDF for Paper-based Documents", © 2000, 12 pages.*

* cited by examiner

SYSTEMS AND METHODS FOR AUTOMATIC FORM SEGMENTATION FOR RASTER-BASED PASSIVE ELECTRONIC DOCUMENTS

TECHNICAL FIELD

The present invention generally relates systems and methods for processing electronic documents. In particular, the invention relates to systems and methods for automatically extracting form information (document structure, elements, format, etc.) from electronic documents such as raster-based passive documents, and storing such form information in a file in accordance with a predetermined DTD (document type definition). This file may be used in applications such as content cross-referencing of related multimedia documents within an electronic document publishing environment.

BACKGROUND

Document processing and understanding is important for a variety of applications such as office automation, creation of electronic manuals, online documentation and annotation etc. One of the most commonly used document formats on the WWW (World Wide Web) and otherwise is the well-known PDF (Portable Document Format) standard. In fact, a large amount of legacy documents are now available "online" because of scanning devices that enable scanning of legacy documents to generate electronic copies (e.g., bit map images) of such documents.

For instance, the Acrobat suite of applications from Adobe allows a user to capture a document and generate a PDF file of the document. The user can then view the PDF file with the Acrobat viewer, for example, and view the document in its original format and appearance. The Acrobat application includes a toolkit that allows a user to scan in legacy documents, or otherwise capture documents created with various desktop publishing products. This enables a user to make such documents available "online" as a PDF file.

Electronic documents such as scanned legacy forms, however, are typically stored in formats (e.g., bitmap representations, GIF, TIFF, etc.) that do not include important structure or format information. Without extracting and saving structure/format information for the electronic document, however, the file can be unusable for various applications. Further, electronic files such as bit map images can be extremely large in size, which can cause problems with respect to storage and transmission bandwidth, for example, for use of such files in a networked environment.

There have been methods proposed for generating formatting information for electronic documents. For instance, one method proposed by Pavlidis, et al, in "*Page Segmentation and Classification*," Computer Vision, Graphics and Image Processing, 54:375-390, 1991, includes analyzing scanned bitmap images to perform classification of the document using a priori knowledge associated with the document's class. It is noteworthy that to date, there has been virtually no research performed in using postscript as a starting point for document analysis. Certainly, if a postscript file is designed for maximum raster efficiency, it can be a daunting task even to reconstruct the reading order for the document. The previous researchers may have assumed that a well structured source text would always be available to match postscript output and, consequently, working bottom-up from postscript would seldom be necessary. However, PDF documents, for example, can be generated in a variety of ways including using OCR (optical character recognition) on bit-mapped pages. It should be appreciated that the additional structure in PDF, over and above that in postscript, can be utilized towards the goal of document understanding. As explained below, the present invention utilizes knowledge of PDF structure to provide efficient methods for extracting relevant form information from PDF files.

Many conventional methods for generating formatting information relate to understanding raster images. However, being an inverse problem by definition, such task can not be performed completely without making broad assumptions (see Kasturi, et al., "*A System for Interpretation of Line Drawing,*", IEEE Transaction on Pattern Analysis and Machine Intelligence). Direct application of such methods on PDF documents would make little sense because such methods are not designed to make best use of the underlying structure of PDF files and would thus produce unacceptable results.

In contrast to conventional methods based on geometric layout analysis, conventional methods based on logical layout analysis have received very little attention. Some methods that use logical layout analysis perform region identification or classification in the derived geometric layout. These approaches, however, are primarily rule based (see, e.g., Krishnamoorthy, et al., "*Syntactic Segmentation and Labeling of Digitized pages from Techical Journals,*" IEEE Transaction on pattern Analysis and Machine Intelligence, 15:743-747, 1993), and consequently, the final outcome depends on the dependability of the prior information and how well that is represented within the rules.

SUMMARY OF THE INVENTION

The present invention relates to systems and methods for automatically extracting form information (document structure, elements, format, etc.) from electronic documents such as raster-based passive documents, and storing such form information in a file in accordance with a predetermined DTD (document type definition).

In general, according to one aspect of the invention, an automated method is provided for extracting form information from PDF files that are created by scanning legacy documents or otherwise. Preferably, PDF document analysis comprises performing document understanding and extracting form information from text portions and/or non-text portions (e.g., figures) that are located within the PDF document.

The extracted form information is then saved in a structured manner that follows a predefined syntax and grammar. Preferably, the extracted form information is stored as an XML (extensible Markup Language) file that follows a predefined DTD (document type definition). These XML files are referred to herein as Anchorable Information Unit (AIU) files.

Advantageously, AIU files according to the invention contain all relevant information regarding the structure, format, content, etc, of the corresponding electronic documents and, thereby significantly increase the usability of such electronic documents in various applications. For instance, AIU files make the electronic documents more intelligent for content cross-referencing between related multimedia documents within an electronic document publishing environment. The AIU files can be used to deliver customized information in a networked environment based on the requirements of the application and the user. The AIU files can be used as references to the extracted information to create automatic hyperlinks between different documents and media types.

These and other aspects, objects, features and advantages of the present invention will be described or become apparent from the following detailed description of the preferred embodiments, which is to be read in connection with the accompanying drawings.

DETAILED DESCRIPTION OF PREFERRED EMBODIMENTS

The present invention generally relates systems and methods for processing electronic documents. In particular, the invention relates to systems and methods for extracting form information from raster-based passive documents, for example, and using such form information for applications such as content cross-referencing between related multimedia documents within an electronic document publishing environment. In general, a form information extraction process according to an embodiment of the invention comprises analyzing an electronic document (e.g., a PDF document) which is created in any fashion (e.g., scan, OCR, etc.) to perform document understanding (e.g., segment text and images) and then extract form information associated with text portion and/or non-text portions (e.g., images) within the electronic document. The extracted form information is stored in a structured format that follows a predefined syntax and grammar (e.g., an XML or SGML file with a prespecified DTD).

It is to be understood that the systems and methods described herein in accordance with the present invention may be implemented in various forms of hardware, software, firmware, special purpose processors, or a combination thereof. Preferably, the present invention is implemented in software as an application comprising program instructions that are tangibly embodied on one or more program storage devices (e.g., magnetic floppy disk, RAM, CD Rom, ROM and flash memory), and executable by any device or machine comprising suitable architecture.

It is to be further understood that because the constituent system modules and method steps depicted in the accompanying Figures are preferably implemented in software, the actual connections between the system components (or the flow of the process steps) may differ depending upon the manner in which the application is programmed. Given the teachings herein, one of ordinary skill in the related art will be able to contemplate these and similar implementations or configurations of the present invention.

Figure 1:
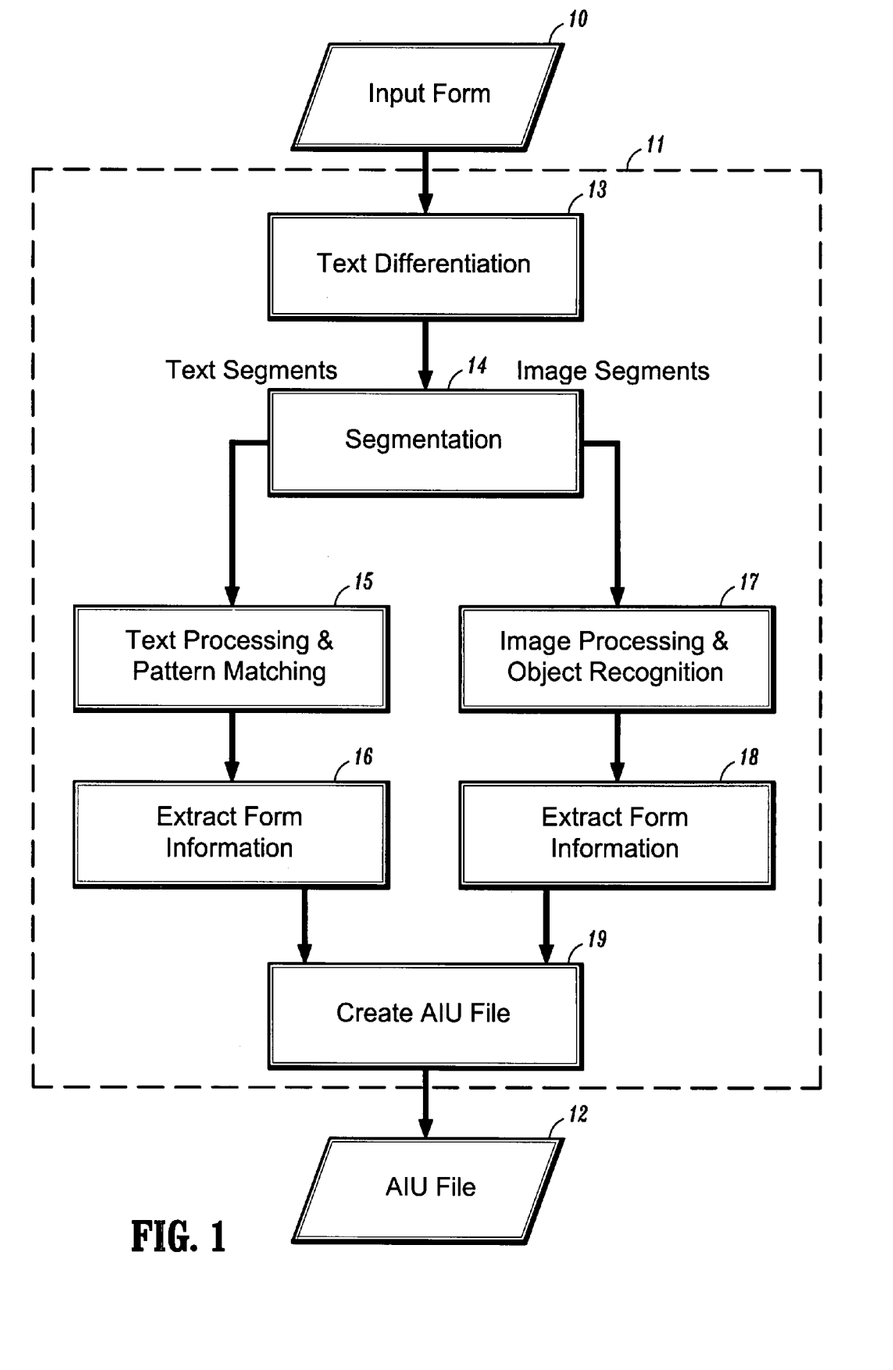
FIG. 1 is a block diagram of a system for extracting form information from an electronic document according to an embodiment of the invention.

Referring now to FIG. 1, a block diagram illustrates a form information extraction system according to an embodiment of the invention. FIG. 1 further depicts a high-level flow diagram of a method for extracting form information according to one aspect of the invention. In general, an electronic document (10), such as a PDF file, or any raster-based passive document, etc., is processed by a form extraction system (11) to generate an output file (12) which comprises form information (e.g., formatting, structure, fields, etc.) associated with the input document (10).

In one preferred embodiment, the extracted form information is stored in an XML (eXtensible Markup Language) file that follows a predefined DTD (Document Type Definition). Such XML files are alternatively referred to herein as AIU (Anchorable Information Unit) files. The AIU files can advantageously be used to deliver customized information of the electronic document according to the requirements of the application and the user.

In the exemplary embodiment of FIG. 1, the form extraction system (11) comprises a text differentiation module (13) which analyzes the input file to identify areas of text and areas of non-text (e.g., images). A segmentation module (14) then segments the identified text areas and non-text areas. The text segments are then processed by a text processing and pattern matching module (15) and a form information extraction module (16), to extract relevant form information from the text segments.

In addition, the non-text segments are processed by an image processing and object recognition module (17) and a form information extraction module (18), to extract relevant form information from the non-text segments.

The extracted form information for the text segments and non-text segments are then processed by an AIU file generation module (19), which creates an AIU file that represents the extracted form information of the text and non-text segments. For example, the processing of the text and non-text segments results in the extraction of important form information within portions that have been properly recognized by the system in its vector form, e.g., lines as lines, text as text, etc., as well as form information that lies within images.

In a preferred embodiment of the invention, XML is used for generating the AIU file (12), which enables versatility of the present invention as applied in various applications. It is to be appreciated that an AIU file according to the invention contains all relevant form information and enables delivery of customized information based on the requirements of the application and the user. The AIU file enables the associated form to be filled just like any other form, with no difference perceived by the end user. The user can input fields as appropriate and such information is stored in the associated AIU file.

By way of example, if the user happens to be a field engineer, then when the user has to relay the information back to a control station, it is not necessary for the user to transmit the entire electronic document (e.g., PDF file). Indeed, only the AIU file needs to be beamed back, which can be very small, containing a few lines of ASCII text, for example. This is especially advantageous when the user is communicating with a mobile device. By way of further example, vital data that must be selectively passed to a specialist who is remotely located on his/her mobile device, can easily be done by simply rendering such data from an AIU file. In other applications, the AIU file can be used for creating appropriate hyperlinks to other parts of the same document or other documents or non-similar media types.

Figure 2:
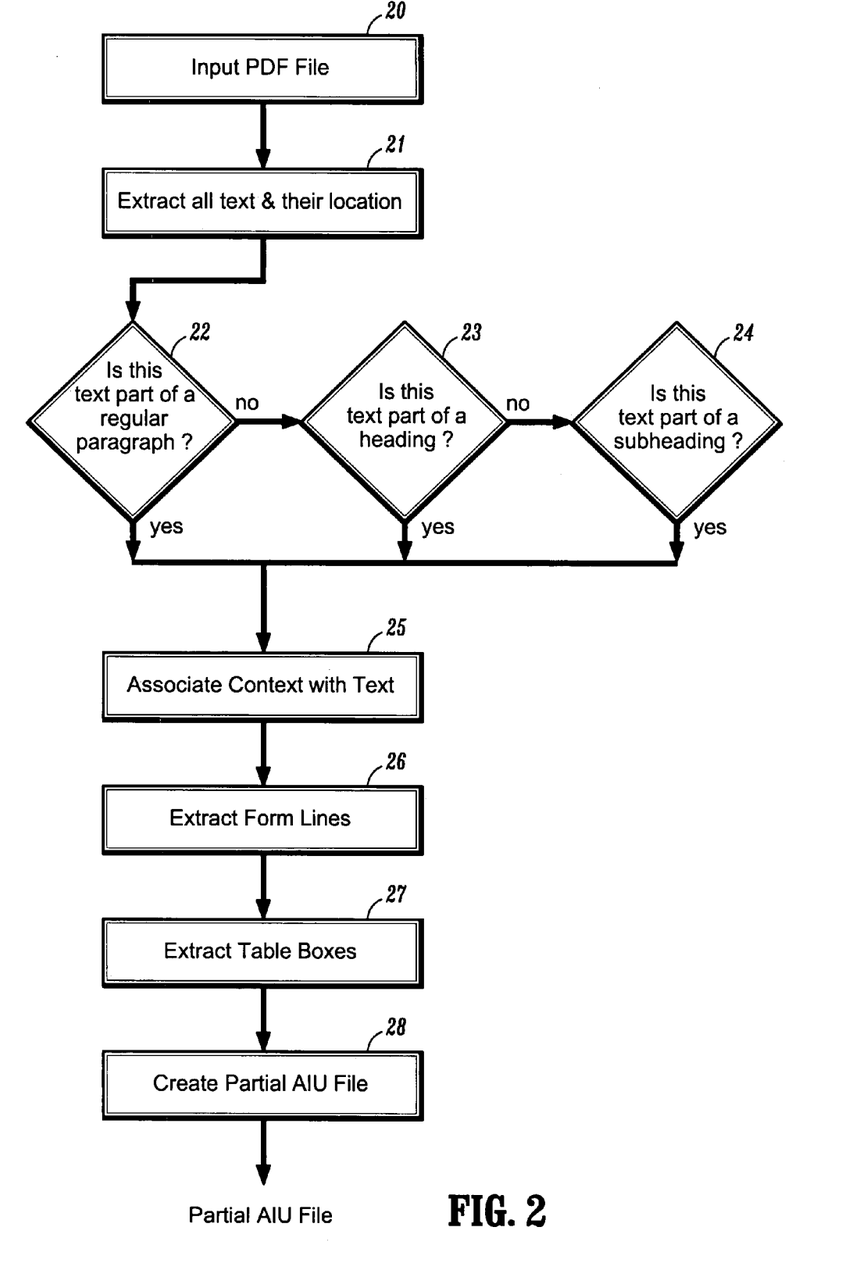
FIG. 2 is a flow diagram of a method for extracting form information according to one aspect of the invention.
Figure 3A:
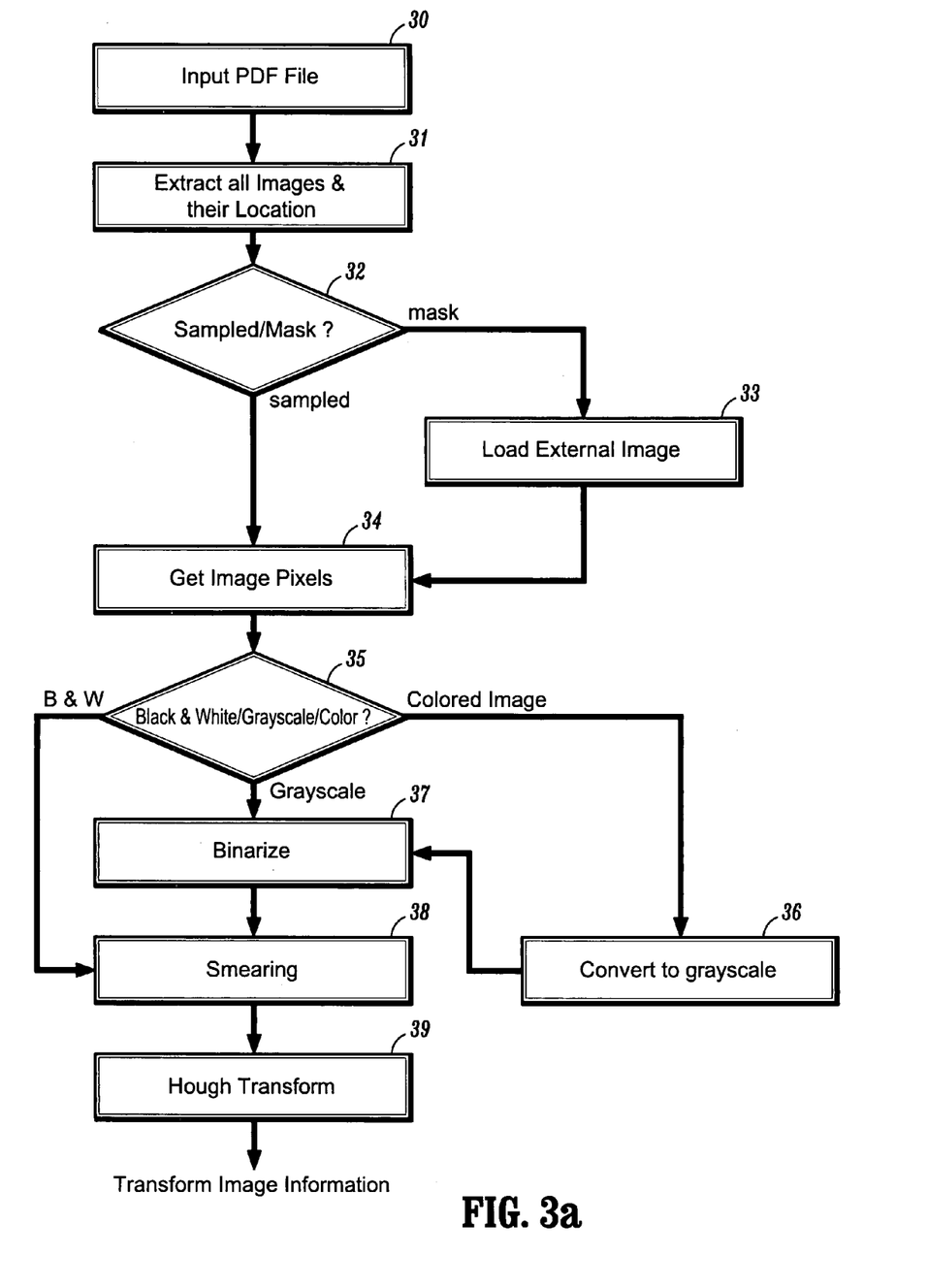
FIGS. 3a and 3b are diagram illustrating a method for extracting form information according to another aspect of the invention.
Figure 3B:
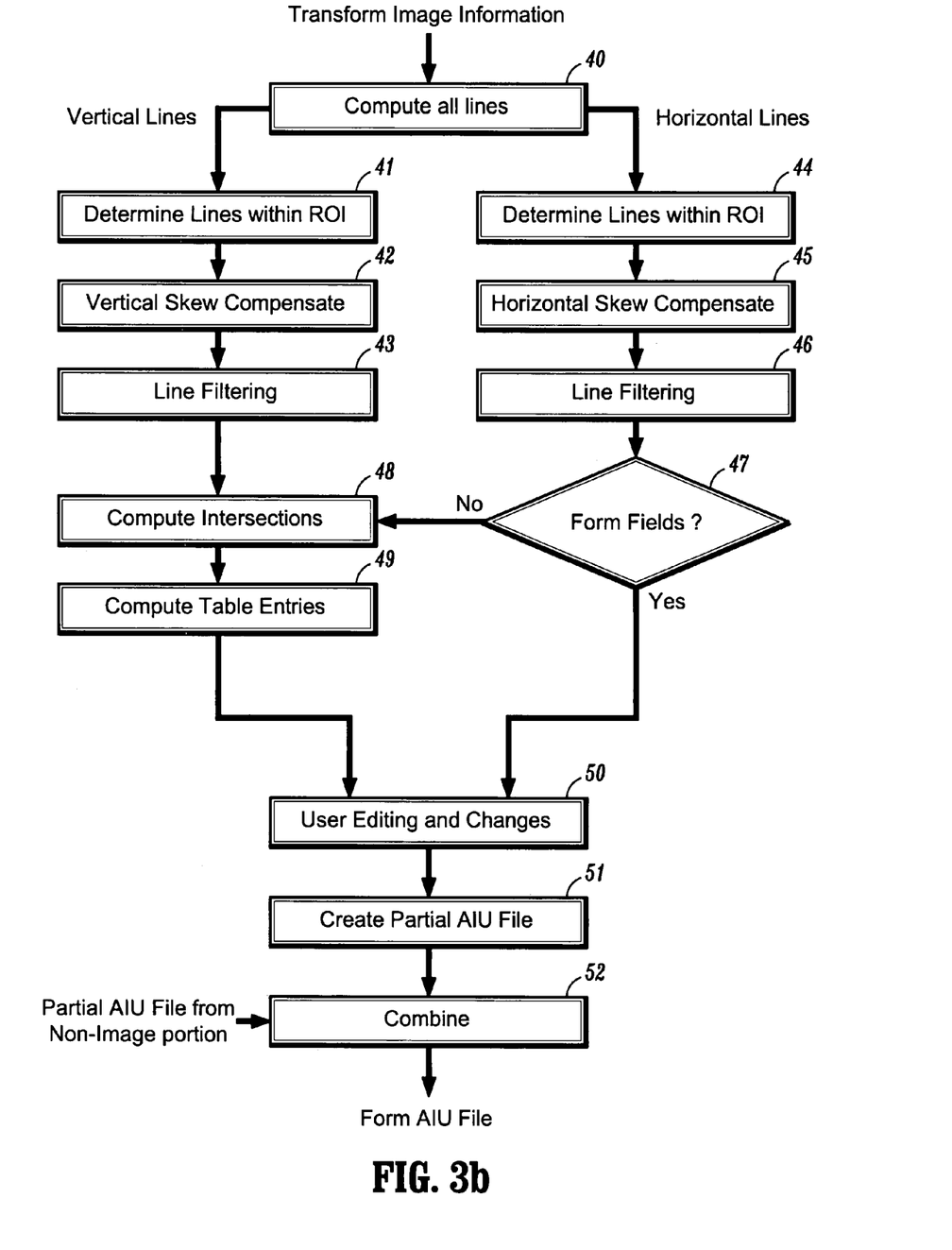

FIGS. 2 and 3 are flow diagrams illustrating methods according to the invention for extracting form information. In the exemplary methods described herein, form extraction is performed for PDF files. It is to be appreciated, however, that the form extraction methods according to the invention can be used with various types of electronic documents, such as raster-based passive documents. In general, to develop form information extraction methods according to the invention, one should first understand programmatically the structure of the electronic document and then preferably use algorithms that are efficient for extracting relevant form information based on the form type. Indeed, electronic files, such as PDF files, could consist of simple text or more generally could consist of a mixture of text and a variety of different types of images such as black and white, gray-level and color. Such a task is nontrivial due to the very nature of the problem where there is such a mix. Once the structure is known, interactive methods could then be developed to quickly identify and extract relevant form information such as form structure and fields.

FIG. 2 is a flow diagram that illustrates a method for extracting form information according to one aspect of the invention. More specifically, FIG. 2 depicts a method for processing text segments to extract form information for such text segments. The method of FIG. 2 is particularly useful for extracting form information from scanned documents, but may be used for other types of electronic documents. In order to assist application programmers to extract words from PDF files, Adobe System provides a software development kit (SDK) that provides access (via an API (application programming interface) of an Acrobat viewer) to the underlying portable document model which the viewer is holding in memory. For PDF documents that are created directly from a text editor such as Microsoft Word or Adobe's Framemaker, this works quite well. For scanned in documents, however, the performance is not sufficient. Furthermore, with double columned documents, such software makes too many errors. For the case of scanned in documents, the present invention provides alternate methods, as will be discussed in detail below, to extract the form structure with respect to text portions together with corresponding location information and style information that is used to render the text.

Referring now to FIG. 2, initially, an electronic document file (e.g., PDF file) is input to the system (step 20). In general, as a first step, all text of the input file are extracted and location information is generated for such text (step 21). More specifically, the text portions are processed to extract titles and fields along with their coordinates and their style. In a preferred embodiment, this process is performed by extracting all the words and then determining bounding box information for the extracted words and a corresponding page number. The parameters of a bounding box for the extracted words are determined from the extracted coordinates.

Next, based on the bounding box information, a determination is made as to whether a given text segment (e.g., word) is part of a regular paragraph (step 22), part of a heading (step 23) or part of a subheading (step 24). For example, in a preferred embodiment, a determination as to whether a given word is part of a regular paragraph is made by using the bounding box information. More specifically, if the bounding box for a given word is aligned horizontally with bounding boxes of several other words (e.g., the bounding boxes all appear at similar heights and are part of a much larger group), then it is likely that the word is part of the regular text for the page (as opposed to a heading, for example).

Furthermore, in a preferred embodiment, a determination as to whether a given word is part of a heading (step 23) or subheading (step 24) is made by using the bounding box information. More specifically, a median font size is determined for the entire text document. Then, if the font size for a given text segment is larger than the median, and if the text group is small (e.g., group does not extend to more than a single line), the given text segment will be considered part of a heading or part of a form title or subheading.

Based on the results of steps 22-24, the text segments are logically associated with their determined context (e.g., paragraph, heading, etc.) (step 25).

Another preferred step is to extract form lines (which is how most fields in a form are) and determine the coordinates of such lines (step 26). There are various methods known in the art that may be used to perform line extraction and a popular method is the well-known Hough Transform method In addition, table boxes are extracted (step 27). In particular, this extraction is preferably performed by finding table boxes that may be fields where a user of the form may insert text. It is to be appreciated that these table boxes are typically well defined by the bounding lines that make up the table rows and columns.

The images that constitute the non-text portion of the document (e.g., diagrams) are extracted along with the bounding boxes which are processed in the next phase.

Accordingly, the text processing described above preferably results in extracting the form titles and fields along with their coordinates and their style.

Then, using the extracted form information (e.g., text context, lines, table boxes, etc.), a partial AIU file is created (step 28) to represent such extracted form information. As explained below, this partial AIU file is combined with another partial AIU file representing extracted form information for non-text (images) portions of the input file, to thereby create an AIU file representing form information for the entire input document.

FIGS. 3A and 3B are flow diagrams illustrating a method for extracting form information according to another aspect of the invention. More specifically, FIGS. 3A and 3B depict a method for processing non-text segments (images) to extract relevant form information for such non-text segments. The Acrobat application does not provide a method for processing these non-text images, but the application can perform OCR (Optical Character Recognition) on the entire document. However, OCR is not adapted to extract form information for text segments or objects as contemplated by the invention. Even with text understanding, results obtained using a general-purpose OCR is very unreliable and results in significant error when directly using such OCR to understand scanned images of diagrams.

Advantageously, the present invention provides novel methods for extracting form information for non-text segments of an electronic document. What makes this problem challenging is the inability to distinguish text from polylines which constitute the underlying line drawings. Although the development of an effective general purpose algorithm that would work for all kinds of form images is very difficult, solutions can be achieved by making use of underlying structures of the concerned documents such as PDF files.

Referring now to FIG. 3A, a method for extracting form information for non-text segments includes an initial step of receiving as input an electronic document file (e.g., PDF file) (step 30) and extracting all images and associated location information for such images (step 31). By way of example, in PDF files, various types of images/objects can be encoded as black and white, gray-level and colored images. For instance, black and white images primarily are used to encode CAD drawings and forms. For such images, objects of interest may include diagrams of certain predefined objects or text segments that might refer to important information such as machine parts.

A next step in the extraction process is to determine whether an extracted image is a sampled image or an image mask (step 32) By way of example, in PDF, an image is denoted XObject whose subtype is Image. The Image subtype allows a content stream to specify a sampled image or image mask. The PDF format allows for image masks, 1-bit, 2-bit, 4-bit and 8-bit grayscale images, and color images with 1, 2, 4 or 8 bits per component.

If a given object (extracted image) is determined to be an image mask (step 32), then the external image is loaded (step 33). Typically, an external image is embedded within the PDF file. In such a case, the reference to that image is found and then based on the type of image and the file format, different decoding techniques are used to extract the image and process it.

If a given object is determined to be a sampled image (step 32), then the image pixel values are obtained and stored directly within the PDF file in a certain encoded fashion (step 34). In either case, the pixel values for the image are obtained and further processed.

A next step in the extraction process is to simplify the images. More specifically, a determination is made as to whether a given image is a black and white, grayscale or color image (step 35). If the given image is a colored image, the colored image is converted to a grayscale image (step 36) and then converted to a black and white image using a binarization process(step 37), wherein the grayscale image is converted to a black and white image by simple thresholding. If the image is determined to be a grayscale image (step 35), the grayscale image will be subjected to the binarization process (step 37) to convert the image to black and white. In the exemplary embodiment, all non-black and white images are preferably converted to black and white because searching for text strings in black/white images is fast and simple and form impressions are adequately represented in black and white.

Next, all black and white images are subjected to a smearing process (step 38). For example, if the number of white pixels between two black pixels is less than a predetermined number, the white pixels are converted to black.

Next, a Hough Transform is preferably used to extract information regarding lines that exist in the image (step 39) and output transform image information. Continuing with reference to FIG. 3B, the transform image information generated by the transform process (step 39) is then used to determine all lines in sections of interest within the given image (step 40). More specifically, this process is performed to determine all horizontal and vertical lines in the image that may correspond to form fields or tables. Lines that have more than some predetermined slope from the x and y axes (e.g., +/−10 degrees) will be discarded.

Preferably, the processing of vertical and horizontal lines is performed separately. For instance, processing with respect the vertical lines preferably comprises filtering the vertical lines to determine which vertical lines fall within a ROI (region of interest) (step 41). More specifically, this process is performed by determining if the starting points and ending points of the vertical lines are within the ROI. All vertical lines whose start and end points are not within the ROI are discarded.

Next, a vertical skew compensation process is performed (step 42) for vertical lines whose inclination with respect to a Y-axis are either greater than −10 degrees or less than +10 degrees. This will compensate for skew that may exist for vertical lines in the scanned file.

The vertical lines are then filtered (step 43). Preferably, the filtering process comprises discarding all vertical lines that are smaller than a few characters and discarding all lines that are too long based on some criteria. For instance, the filtering process (step 43) will discard vertical lines that are deemed artifacts which are generated as a result of scanning. The remaining vertical lines are then deemed candidates for tables.

It is to be appreciated that filtering may be performed manually via an associated user interface, whereby a user can remove vertical lines that are not actually part of tables, for instance.

Next, processing with respect the horizontal lines preferably comprises filtering the horizontal lines to determine which horizontal lines fall inside a region of interest (step 44). Preferably, all horizontal lines whose start and end points are not within the ROI are discarded. Next, a horizontal skew compensation process is performed (step 45) for horizontal lines whose inclination with respect to the X-axis is either greater than −10 degrees or less than +10 degrees, for example. This will compensate for skew that may exist for horizontal lines in the scanned file.

The horizontal lines are then filtered (step 46). Preferably, the filtering process comprises discarding all horizontal lines that are smaller than a few characters and discarding all horizontal lines that are too long based on certain criteria. Again, this filtering process may be used to remove horizontal lines that are deemed artifacts that result from the scanning process. The remaining lines are then deemed candidates for form fields.

As noted above, filtering may be performed manually whereby a user can remove lines that are not actual fields via an associated user interface. In addition, the user interface would enable a user to add extra fields if such fields were not already detected.

Next, determinations are made as to whether the resulting horizontal lines are part of fields or tables (step 47). For instance, if a given horizontal line intersects with any other line and is large enough, the horizontal line will not be considered part of a form field (negative determination in step 47), but rather part of a table (in which case the horizontal line is processed with vertical lines to determine intersections (step 48) and table entries (step 49)). On the other hand, a given horizontal line is deemed to be part of a form field (affirmative determination in step 47) if, for instance, the line does not intersect with any other line. Another step involves determining intersections between horizontal and vertical line pairs (step 48). Then, table entries are determined (step 49) by identifying non-overlapping boxes from the determined intersection points. As noted above, the user has the option to add/delete form fields/table entries (step 50) using an associated user interface.

Once the form information is extracted for the non-text portion of the input file, a partial AIU file is generated (step 51) representing such information. The partial AIU files of the text and non-text portions are then combined (step 52) to form the AIU file that represents all the extracted form information for the text and non-text portion of the input file (step 52). After processing a PDF file, for example, using the methods described herein to extract form information and create an associated AIU file, the PDF file is associated with its AIU file.

In a preferred embodiment, the resulting AIU file is preferably created using the SGML (Standard Generalized Markup Language) syntax, which is a known standard. Details on the SGML syntax can be found, for example, in the Official document at ISO. SMGL, ISO8879:1986, Text and Office Systems -Standard generalized markup language, 1986. More specifically, in a preferred embodiment, the structure of an electronic document (e.g., PDF document) is preferably defined in SGML/XML(or extensions thereof) to capture the extracted form information. As noted above, objects that are extracted from the electronic document are referred to herein as AIUs. The information extracted from an electronic document such as a PDF document is thus represented as an instance of PDF AIU Document Type Definition (DTD). Since AIUs according to the invention are well-structured, as explained below, the AIUs can be used to perform automatic hyperlinking between corresponding PDF documents and all other types of documents.

The following is an exemplary AIU specification according to one aspect of the invention. Preferably, an AIU file is defined in a hierarchical manner as follows. At the root, there is an AIUDoc definition which encompasses the header, footer and the extracted information within the pdfDocX field.

```
<!ELEMENT    AIUDoc      --(DocHeader, pdfDocX, DocFooter)>
<!ATTLIST    AIUDoc
             Id          CDATA       #IMPLIED
             Type        CDATA       #IMPLIED
             Name        CDATA       #IMPLIED
>
```

The definition of the DocHeader is preferably given as:

```
<!ELEMENT    DocHeader   --(DocType, DocDesc)>
<!ATTLIST    DocHeader
             Id          CDATA       #IMPLIED
             Type        CDATA       #IMPLIED
             Name        CDATA       #IMPLIED
             File        CDATA       #IMPLIED
>
```

The fields in the pdfDocX are preferably given by:

```
<!ELEMENT    PdfDocX     --((PdfSeg | PdfAIU)*)>
<!ATTLIST    PdfDocX
             Id          CDATA       #IMPLIED
>
```

The PdfSeg field, which characterizes sub-documents (or sections) in the document is preferably defined as:

```
<!ELEMENT    PdfSeg      --(PdfSeg2 | PdfAIU)*)>
<!ATTLIST    PdfSeg
             Id          CDATA       #IMPLIED
>
```

The PdfSeg2 fields, which are segments in the document are preferably defined by:

```
<!ELEMENT    PdfSeg2     --(pdfAIU*)>
<!ATTLIST    PdfSeg2
```

-continued

```
             Id             CDATA       #IMPLIED
             StartLocation  CDATA       #IMPLIED
             EndLocation    CDATA       #IMPLIED
>
```

Finally, the AIUs are preferably defined using the following fields:

```
<!ELEMENT    PdfAIU          --((Link)*)>
<!ATTLIST    PdfAIU
             Id              CDATA       #IMPLIED
             Type            CDATA       #IMPLIED
             Name            CDATA       #IMPLIED
             BoundaryCoords  CDATA       #IMPLIED
             Page            CDATA       #IMPLIED
>
```

It is to be understood that while the above example lists important attributes that are relevant to PDF AIUs according to the invention, it is to be appreciated that there can be other optional attributes that are relevant for AIUs related to other media types.

In a preferred embodiment, the PDF document is structured in a hierarchical manner. With the above exemplary AIU specification, the root represents the entire document, which is then divided into "sub-documents" or sections. The AIU file preferably begins with a description of the type of the underlying media type (which in the exemplary embodiment is PDF). The document header preferably comprises four different fields including the underlying PDF file name, a unique Id for the whole PDF file, document type definition (which explains the context of the PDF file) and a more specific document description (which explains the content of the PDF file).

Preferably, the information extracted from a PDF file is stored within the PdflDocX structure, which has an unique Id derived from the Id of the PDF file itself. As mentioned above, the PDF is preferably organized in a hierarchical manner using sub-documents (or sections) and segments. Preferably, as indicated above the segments have the following attributes: a unique Id for each segment, and start and end locations of the segments to define the extent of these sections. It is to be understood that based on the requirements and size of the document, further attributes can be used as well.

Further, the PDF AIU preferably has a unique Id, which can be any of the following types: rectangle, ellipse and polygon. Furthermore, each AIU has an unique name. In the exemplary illustration above, the BoundaryCoords field specifies the coordinates of the underlying object of interest. The Page field specifies the page location of the underlying document. The BoundaryCoords defines the bounding box. In case of rectangles and ellipses, only the upper left and lower right corners of the bounding box are preferably defined. In case of a polygon, all the nodes are preferably defined.

The following is an example of a PDF AIU file that is based on the above AIU specification, according to one aspect of the invention.

```
<AIUDoc Type="Pdf">
<DocHeader File="test.pdf" Id="Ntest">
<DocType> Training</DocType>
<DocDesc> Overview of V94.2 Gas Turbine</ DocDesc>
</DocHeader>
<PdfDocX Id="IDV942" <PdfSeg Id="section1">
<pdfSeg2 Id="IDV942P1" StartLocation="0" EndLocation="20">
</PdfSeg2>
<pdfSeg2 Id="IDV942P2" StartLocation="21" EndLocation="50">
</pdfSeg2>
</pdfSeg>
<pdfAIU Id="PAIU01" Type="rectangle" Name="object1" Page="2"
    BoundaryCoords="66 100 156 240">
</pdfAIU>
<pdfAIU Id="PAIU02" Type="ellipse" Name="Object2" Page="8"
    BoundaryCoords="100 156 240 261">
</pdfAIU>
<pdfAIU Id="PAIU05" Name="polygon" Name="object1" Page="22"
    BoundaryCoords="438 81 411 88 397 102 383 138 406 185 480 175
    493 122 465 89 438 81" </pdfAIU>
</pdfDocX>
<DocFooter></DocFooter>
</AIUDoc>
```

Thus, from the above example, an AIU file according to one aspect of the invention simply comprises a sequence of one or more parsable character data, preferably containing a string of ASCII characters and numbers.

The following section will describe methods for hyperlinking PDF Documents using the AIU files according to the invention, which enables development of hypermedia applications. Because of the widespread use and popularity of global networks such as the WWW (World Wide Web), there has been significant attention to development of hypermedia applications that enable effective and automatic creation of hypermedia. Unfortunately, current methods that are used by hypermedia authors for creating hypermedia are typically laborious and manually intensive, and such methods render the task of referencing content in documents that are not just limited to text especially labor intensive. Typically, hypermedia authors must locate areas or keywords of particular significance (hotspots) which are then appropriately hyperlinked to relevant information. In an electronic document, the user can thus retrieve associated detailed information by mouse clicking on a hotspot as the system interprets the associated hyperlinks and fetches the corresponding information. Advantageously, the present invention provides methods for developing hypermedia applications, for example, using the well-structured AIU files (e.g., PDF AIU files).

In accordance with the present invention, hyperlinking for a PDF AIU can either be performed manually or in an automatic fashion. Manual links can be inserted during the AIU outlining phase as described above. Advantageously, since the information extracted from a PDF file is stored in well-structured AIU files, the invention enables the development of methods for automatic hyperlinking to automatically hyperlink PDF AIUs with other types of documents based on predefined Hyperlink specifications.

Figure 4:
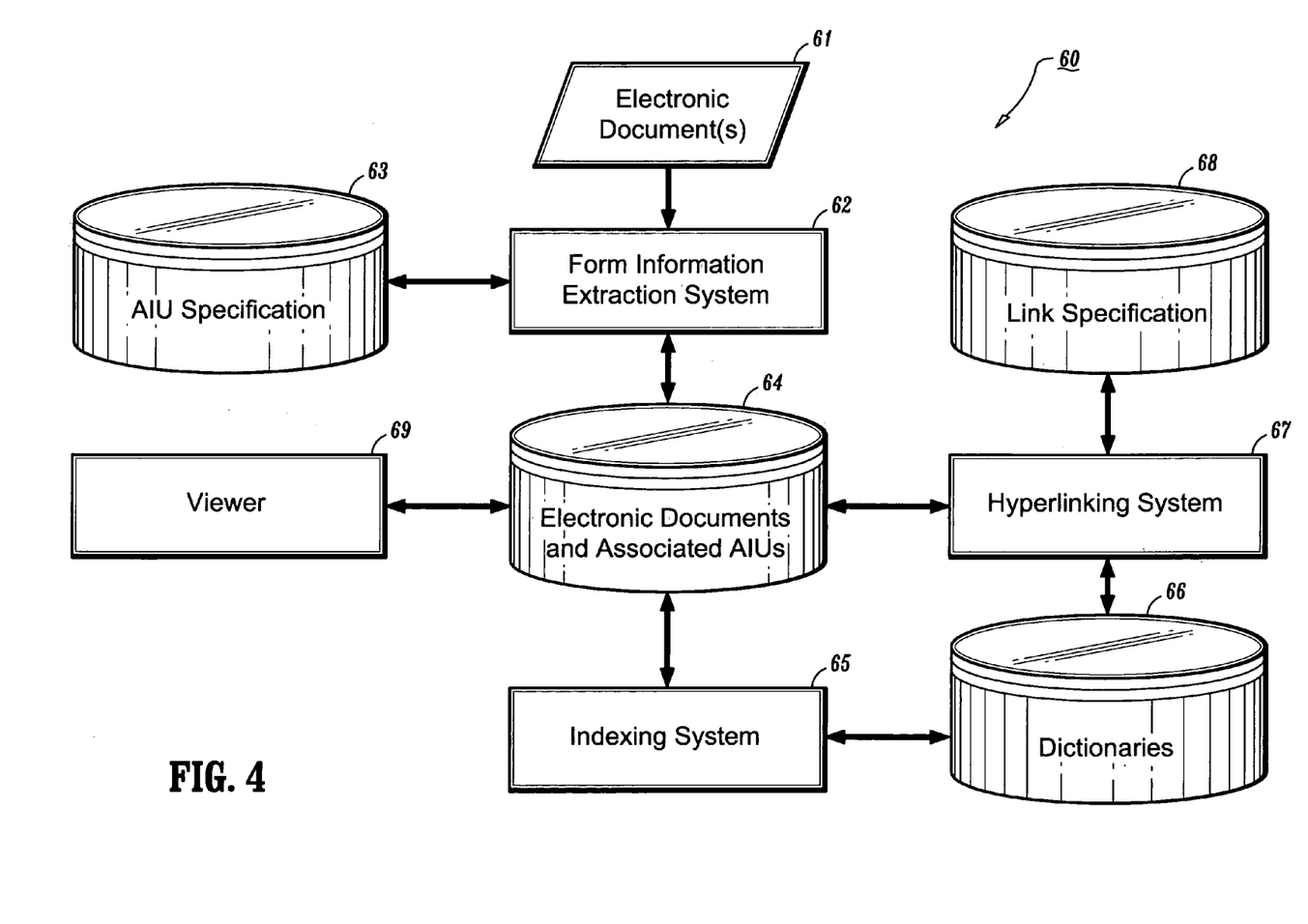
FIG. 4 is a diagram illustrating a system/method for automatically hyperlinking electronic documents using extracted form information according to an embodiment of the invention.

FIG. 4 is a diagram illustrating a system and method for automatically hyperlinking electronic documents using extracted form information according to an embodiment of the invention. The system (60) receives as input one or more electronic documents (61) (e.g., PDF files) and processes the input files to extract form information using the extraction system (62). The extraction system may be the same, or similar, to the system (11) shown in FIG. 2. The extraction system (62) generates AIU files based on a predefined AIU specification (63). The electronic documents and associated AIUs are stored in a database (64).

The system (60) further comprises an indexing system (65) (which is preferably a SGML indexer), which pre-indexes the SGML-based AIU files in database (64). The indexing results in dictionaries (66) listing every SGML element in the order the elements appear in the documentation, as well as an indexes into the dictionaries.

A hyperlinking system (67) uses the dictionaries (66) a predefined link specification (68) to create links using pattern matching on the dictionary files (66). This process enables links to be created between PDF AIUs in database (64), for example. Any suitable hyperlinking system may be used and a preferred hyperlinker is described, for example, in the article by Liu et al, "*Towards Automating the Creation of Hypermedia Service Manuals by Compiling Specifications*," Proc. IEEE Multimedia, pp. 23-212, 1994. It is to be appreciated that the hyperlinking system (67) can be used with an AIU authoring system of the invention by being able to structure the PDF information using the AIU specification language as explained above.

In addition, the hyperlink system (67) may comprise a manager that can be used to incrementally update link rules (68). For example, link manager software can use the link database (68) to keep track of link rule changes by using time stamps. Then, incremental hyperlinking can performed either by changing existing link specifications or by adding some extra link specifications. When adding new link specifications, the hyperlinker executes the new link specification on all documents, adds new links without destroying the old ones. When a link becomes obsolete, based on the Id of the old link, the old links are removed. A similar procedure is adopted when adding new links.

The following example describes a link specification, wherein definition and fields for links are preferably as follows:

```
<!ELEMENT   Link              --((\#PCDATA)+)>
<!ATTLIST   Link
            LinkId      CDATA     #IMPLIED
            Type        CDATA     #IMPLIED
            SubType     CDATA     #IMPLIED
            Linkend     CDATA     #IMPLIED
            Book        CDATA     #IMPLIED
            Focus       CDATA     #IMPLIED
            LinkRuleId  CDATA     #IMPLIED
            Labels      CDATA     #IMPLIED
            ...
        >
```

In the above exemplary link specification, Type defines the type of the destination, e.g., if it is text or image or PDF, etc. Focus defines the text that is highlighted at the link destination. Book represents the book that the destination is part of. In one exemplary application of the invention for a hyperlinked manual, they are organized as a hierarchical tree, where each manual is represented as a book. Linkend contains the destination information. LinkId is an index to a database, if the destination points to that. LinkruleId indicates what rule created the associated link. SubType is similar to the Type definition in the AIU specification above. Labels provide a description of the link destination. It is to be appreciated that other optional attributes may be used for a link specification according to the invention.

The following example provides an instance of a hyperlinked AIU file, wherein Link elements are manually or automatically added to PDF AIUs that are to be hyperlinked to their destinations during playback.

```
<AIUDoc Type="Pdf">
...
<PdfDocX Id="IDV942"
<PdfSeg Id="Document1">
  ...
  </PdfSeg>
...
<PdfAIU Id="PAIU01" Type="rectangle" Name="object1" Page="2"
    BoundaryCoords="66 100 156 240">
...
<Link Type="Text" Subtype="ID" LinkId="7001"
Linkend="N13509426"
    Book="31" Labels="Text Document in Vol 3.1">
  </Link>
</pdfAIU>
...
<pdfAIU Id="PAIU04" Type="ellipse" Name="Object2" Page="8"
    BoundaryCoords="270 320 373">
...
<Link Type="Text" Subtype="ID" LinkId="7002" Linkend="HL133"
    Book="31" Labels="Text Document in Vol 3.1">
  </Link>
</pdfAIU>
...
</pdfDocX>
<DocFooter> </DocFooter>
</AIUDoc>
```

After the hyperlinking has been performed using the system/method of FIG. 4, for example, it is important to be able to obtain the desired functionality while viewing the documents. In a preferred embodiment, a viewer (69) comprises a conventional ADOBE reader that is extended by using special purpose software to achieve interprocess communication via a link manager. In accordance with one aspect of the invention, when the viewer (69) is given a command to load a certain PDF file from database (64), while loading the PDF file, the viewer (69) determines if a corresponding AIU file is available for that file. If so, the AIU file is loaded along with the original PDF file.

Then, for each entry, in the AIU file, a boundary is drawn around the object of interest. If the user clicks on any of the objects, the viewer (69) communicates with the link manager with the appropriate Link Id. The link manager then executes the link destination. Often within a multimedia documentation environment, this means jumping to a particular point of the text or showing a detailed image of the object in question. In that case, the SGML browser jumps to that point in the SGML document.

In summary, the systems and methods described herein for extracting form information provide many advantages over conventional methods, and enable the development of useful application. For instance, the methods and systems described herein provides a unique and efficient method for extracting and storing form information from an unstructured PDF file into a structured format. In addition, methods are provided for efficiently extract form information from PDF files which are directly created from text editors and store the extracted information in a context sensitive hierarchically structured manner. Further, methods are provided to efficiently extract form information from PDF files that are scanned and contain primarily bitmap information. Moreover, the use of XML-based AIU files to store the extracted information using a predefined grammar, enables automatic hyperlinking and context sensitive searching by direct use of the AIU files.

Although illustrative embodiments have been described herein with reference to the accompanying drawings, it is to be understood that the invention is not limited to the precise system and method embodiments described herein, and that various other changes and modifications may be affected therein by one skilled in the art without departing form the scope or spirit of the invention. All such changes and modifications are intended to be included within the scope of the invention as defined by the appended claims.

What is claimed is:

1. A method for processing electronic documents, comprising the steps of:

receiving as input an electronic document, wherein the electronic document is a PDF (portable document format) file and wherein at least a portion of the electronic document is raster-based;

extracting form information from text portions and non-text portions of the electronic document, the form information including form lines and table boxes extracted from raster-based data; and generating a structured document for the electronic document, wherein the structured document represents the extracted form information of the text portions and the extracted form information of the non-text portions in a well-defined, hierarchical structure based on a predefined document type definition, wherein the step of extracting form information comprises the steps of:

segmenting text portions and non-text portions;

separately processing the text portions and non-text portions to extract associated form information; and combining the extracted form information of the text portions and non-text portions, and wherein the step of separately processing the non-text portions comprises the steps of:

extracting images and location information for the images;

converting grayscale and color extracted images to black and white images;

determining horizontal and vertical lines in the extracted images; and determining table entries and form fields in the extracted images using the horizontal and vertical lines.

2. The method of claim 1, wherein the step of processing the text portions of the electronic document comprises:

extracting text segments and corresponding location information of the extracted text segments; and determining a context of each text segment using the location information.

3. The method of claim 2, wherein the context of a text segment comprises of a paragraph, heading title and subheading.

4. The method of claim 1, wherein the step of determining horizontal and vertical lines comprises the steps of:

performing a Hough Transformation to extract line information from an image;

determining lines in the image using the extracted line information; and discarding lines having a slope that exceeds a predetermined threshold.

5. The method of claim 1, further comprising the step of removing skew from the horizontal and vertical lines.

6. The method of claim 1, wherein the step of determining table entries and form fields using the horizontal and vertical lines, comprises the steps of:

determining intersections between horizontal and vertical line pairs;

determining table entries from the determined intersections; and associating horizontal lines that do not intersect other lines as part of form fields.

7. The method of claim 1, wherein the structured document is based on SGML, XML or extensions thereof.

8. A program storage device readable by machine, tangibly embodying a program of instructions executable by the machine to perform method steps for processing electronic documents, the method steps comprising:

receiving as input an electronic document, wherein the electronic document is a PDF (portable document format) file and wherein at least a portion of the electronic document is raster-based;

extracting form information from text portions and non-text portions of the electronic document, the form information including form lines and table boxes extracted from raster-based data; and generating a structured document for the electronic document, wherein the structured document represents the extracted form information of the text portions and the extracted form information of the non-text portions in a well-defined, hierarchical structure based on a pre-defined document type definition, wherein the instruction for extracting form information comprise instructions for performing the method steps of:

segmenting text portions and non-text portions;

separately processing the text portions and non-text portions to extract associated form information; and combining the extracted form information of the text portions and non-text portions, and wherein the instructions for separately processing the non-text portions comprise instructions for performing the method steps of:

extracting images and location information for the images;

converting grayscale and color extracted images to black and white images;

determining horizontal and vertical lines in the extracted images; and determining table entries and form fields in the extracted images using the horizontal and vertical lines.

9. The program storage device of claim 8, wherein the instructions for processing the text portions of the electronic document comprise instructions for performing the method steps of:

extracting text segments and corresponding location information of the extracted text segments; and determining a context of each text segment using the location information.

10. The program storage device of claim 9, wherein the context of a text segment comprises one of a paragraph, heading, title and subheading.

11. The program storage device of claim 8, wherein the instructions for determining horizontal and vertical lines comprise instructions for performing the method steps of:

performing a Hough Transformation to extract line information from an image;

determining lines in the image using the extracted line information; and discarding lines having a slope that exceeds a predetermined threshold.

12. The program storage device of claim 8, further comprising instructions for performing the step of removing skew from the horizontal and vertical lines.

13. The program storage device of claim 8, wherein the instructions for determining table entries and form fields using the horizontal and vertical lines comprise instructions for performing the steps of:

determining intersections between horizontal and vertical line pairs;

determining table entries from the determined intersections; and associating horizontal lines that do not intersect other lines as part of form fields.

14. The program storage device of claim 8, wherein the structured document is based on SGML, XML or extensions thereof.

* * * * *